US009321462B2

(12) United States Patent
Terazawa (10) Patent No.: US 9,321,462 B2
(45) Date of Patent: Apr. 26, 2016

(54) LANE DEVIATION PREVENTION CONTROL APPARATUS OF VEHICLE (71) Applicant: FUJI JUKOGYO KABUSHIKI KAISHA, Tokyo (JP)

(72) Inventor: Takeshi Terazawa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/665,899

(22) Filed: Mar. 23, 2015

(65) Prior Publication Data
US 2015/0274163 A1  Oct. 1, 2015

(30) Foreign Application Priority Data

Mar. 31, 2014 (JP) ................................. 2014-073027

(51) Int. Cl.
G06F 7/00 (2006.01)
B60W 30/12 (2006.01)
B60W 10/20 (2006.01)
G06F 17/10 (2006.01)
G08G 1/16 (2006.01)
B60T 8/1755 (2006.01)
B62D 6/00 (2006.01)
B62D 15/02 (2006.01)
B60R 21/00 (2006.01)

(52) U.S. Cl.
CPC ............... *B60W 30/12* (2013.01); *B60W 10/20* (2013.01); *B60R 21/00* (2013.01); *B60T 8/17551* (2013.01); *B60T 8/17557* (2013.01); *B60W 2550/146* (2013.01); *B60W 2710/207* (2013.01); *B62D 6/00* (2013.01); *B62D 15/025* (2013.01); *G06F 7/00* (2013.01); *G06F 17/10* (2013.01); *G08G 1/16* (2013.01)

(58) Field of Classification Search
CPC ........... B60R 21/00; G06F 17/10; G06F 7/00; G08G 1/16; B60T 8/17551; B60T 8/17557; B60W 30/12; B62D 15/025; B62D 6/00
See application file for complete search history.

(56) References Cited

U.S. PATENT DOCUMENTS

| 7,571,053 | B2* | 8/2009 | Ishikura | .............. B60T 8/17551 340/438 |
| 8,457,868 | B2* | 6/2013 | Tange | ................... B60W 30/12 701/116 |
| 2007/0100551 | A1* | 5/2007 | Ishikura | .............. B60T 8/17551 701/301 |
| 2011/0015850 | A1* | 1/2011 | Tange | ................... B60W 30/12 701/116 |

FOREIGN PATENT DOCUMENTS

JP          07-105498 A    4/1995

* cited by examiner

Primary Examiner — Behrang Badii
(74) Attorney, Agent, or Firm — McDermott Will & Emery LLP (57) ABSTRACT First support control for determining lane deviation on the basis of a predicted lane deviation time is selected when a vehicle lateral position is within a region on the outer side of a dead zone and on a lane center side further inward than a predetermined position. Second support control for determining the lane deviation on the basis of the vehicle lateral position and a yaw angle to lane is selected when the vehicle lateral position is within a region on the lane end side on the outer side of the predetermined position.

16 Claims, 8 Drawing Sheets

LANE DEVIATION PREVENTION CONTROL APPARATUS OF VEHICLE

CROSS-REFERENCE TO RELATED APPLICATION

The present application claims priority from Japanese Patent Application No. 2014-073027 filed on Mar. 31, 2014, the entire contents of which are hereby incorporated by reference.

BACKGROUND

1. Technical Field

The present invention relates to a lane deviation prevention control apparatus of a vehicle that prevents the vehicle from deviating from a lane in which the vehicle travels.

2. Related Art

In recent years, various devices for supporting driving have been developed and put to practical use for vehicles. A lane deviation prevention control apparatus that prevents deviation from a lane is one of such devices. For instance, Japanese Unexamined Patent Application Publication (JP-A) No. H7-105498 discloses a technique of a traveling state determining device of an automobile that predicts a deviation state from a lane on the basis of a distance to a point of intersection of an estimated traveling path of the vehicle and a side edge of a line and on the basis of an angle formed by the estimated traveling path and the side edge at the point of intersection and automatically corrects steering in order to prevent deviation on the basis of the prediction.

In the lane deviation prevention control disclosed in JP-A No. H7-105498, it is possible to generate vehicle behavior for preventing deviation from a lane on the basis of a predicted lane deviation time. However, in a situation in which a vehicle travels near a lane end and when a yaw angle of the vehicle with respect to the lane is small, a predicted lane deviation time is calculated to be long. Therefore, as a result, a divergence from deviation prevention start time desired by a driver occurs. For instance, the driver feels that the control starts late.

SUMMARY OF THE INVENTION

The present invention has been devised in view of the above circumstances and it is an object of the present invention to provide a lane deviation prevention control apparatus of a vehicle that sets control start timing of lane deviation prevention to proper timing not diverging from a sense of a driver and does not give a sense of discomfort to the driver.

An aspect of the present invention provides a lane deviation prevention control apparatus of a vehicle according to an aspect of the present invention includes a support controller that determines whether or not the vehicle deviates from a lane in which the vehicle is traveling and, when determining that the vehicle deviates from the lane, executes support control including at least a warning for preventing the lane deviation. The support controller includes: a first support controller that calculates a predicted lane deviation time until the vehicle deviates from the lane in future, on the basis of a vehicle lateral position in a width direction of the lane in which the vehicle is traveling, a yaw angle of the vehicle with respect to the lane, and vehicle speed, and determines the lane deviation from the predicted lane deviation time; and a second support controller that determines whether the vehicle deviates from the lane, when the yaw angle of the vehicle with respect to the lane points to a direction deviating from the lane. The support controller selects the first support controller when the vehicle lateral position is closer to a lane center than to a predetermined position that is set according to a traveling environment, and selects the second support controller when the vehicle lateral position is closer to a lane end side than to the predetermined position.

DETAILED DESCRIPTION

An example of the present invention is described with reference to the drawings.

Figure 1:
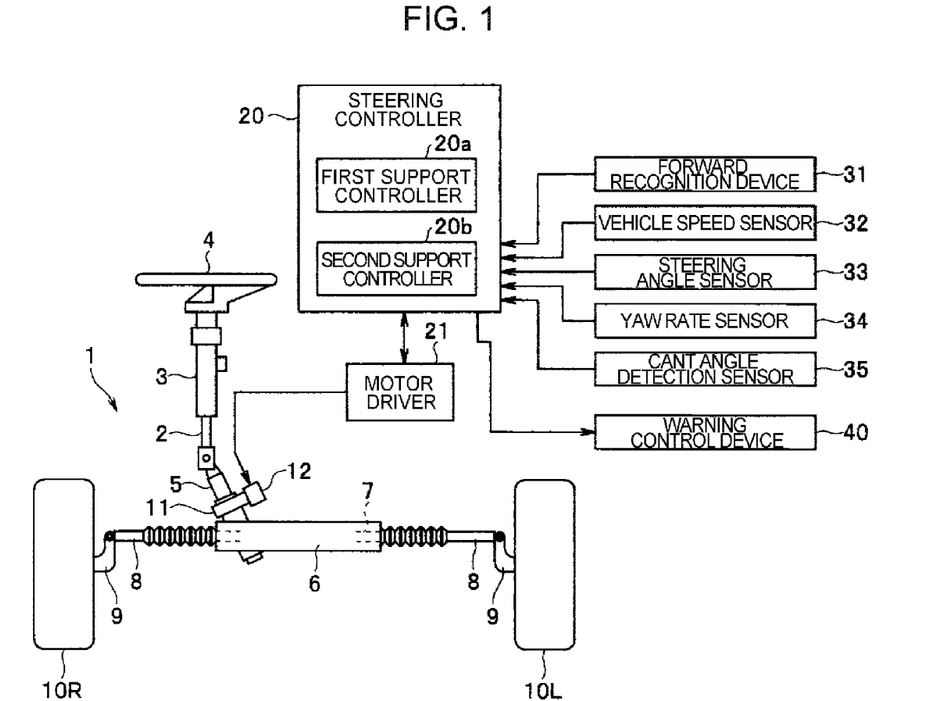
FIG. 1 is a configuration diagram of a steering system of a vehicle.

In FIG. 1, reference numeral 1 denotes an electric power steering device that can freely set a steering angle independently from a driver input. In the electric power steering device 1, a steering shaft 2 is turnably supported by a not-illustrated vehicle body frame via steering column 3. One end of the steering shaft 2 is extended towards a driver's seat and the other end is extended towards an engine room. A steering wheel 4 is fixed to the driver's seat side end of the steering shaft 2. A pinion shaft 5 is connected to the end extended towards the engine room.

In the engine room, a steering gear box 6 extending to the vehicle width direction is disposed. A rack shaft 7 is inserted through and supported by the steering gear box 6 to be capable of reciprocatingly moving. A pinion formed in the pinion shaft 5 is meshed with a rack (not illustrated in the figure) formed in the rack shaft 7 to form a steering gear mechanism of a rack-and-pinion type.

Left and right ends of the rack shaft 7 are respectively projected from ends of the steering gear box 6. Front knuckles 9 are connected to the ends via tie rods 8. The front knuckles 9 turnably support left and right wheels 10L and 10R functioning as steered wheels and are steerably supported by the vehicle body frame. Therefore, when the steering wheel 4 is operated to rotate the steering shaft 2 and the pinion shaft 5, the rack shaft 7 moves in the left right direction according to the rotation of the pinion shaft 5. The front knuckles 9 turn about king pin shafts (not illustrated in the figure) according to the movement. The left and right wheels 10L and 10R are steered in the left and right direction.

An electric power steering motor (an electric motor) 12 is connected to the pinion shaft 5 via an assist transmission mechanism 11. The electric motor 12 assists steering torque applied to the steering wheel 4 and adds steering torque for obtaining a set target turning amount (a target yaw rate, for example). A target torque serving as a control output value is output to a motor driver 21 from a steering controller 20, and the electric motor 12 is driven by the motor driver 21.

The steering controller 20 has an electric power steering control function for assisting a steering force of a driver, a lane keep control function for causing a vehicle to travel along a target traveling path, a lane deviation prevention control function for determining deviation of the vehicle from line marking lines (left and right lane lines) to prevent deviation from the lane, and the like. In this example, the configuration of the lane deviation prevention control function is described. In this example, the configuration of the lane deviation prevention control function of the steering controller 20 is described.

A forward recognition device 31, which detects the lane marking lines (the left and right lane lines) and acquires lane information and posture angle/position information of the vehicle with respect to the lane from the lane marking lines, is connected to the steering controller 20. Further, a vehicle speed sensor 32 that detects vehicle speed V, a steering angle sensor 33 that detects a steering angle (a steer angle) θp, a yaw rate sensor 34 that detects a yaw rate γ, and a cant angle detection sensor 35 that detects a cant angle θca of the lane are connected to the steering controller 20.

The forward recognition device 31 is attached to, for instance, the front of the ceiling in the interior. The forward recognition device 31 includes a pair of CCD cameras that performs stereo image pickup of a target on the outside from different viewpoints and a stereo image processing device that processes image data from the CCD camera. The processing of the image data from the CCD camera in the stereo image processing device of the forward recognition device 31 is performed, for instance, as described below.

First, the stereo image processing device calculates, with respect to a pair of stereo images in a traveling direction of the vehicle picked up by the CCD camera, distance information from deviation of positions corresponding to the pair of stereo images and generates a distance image. In recognition of lane line data, a luminance change in the width direction of a road is evaluated on the basis of knowledge that a lane line has high luminance compared with a road surface. The positions of left and right lane lines on an image plane are specified on the image plane. Positions (x, y, z) on an actual space of the lane lines are calculated by a well-known coordinate conversion formula on the basis of positions (i, j) on the image plane and a parallax calculated concerning the positions, that is, on the basis of the distance information.

Figure 2:
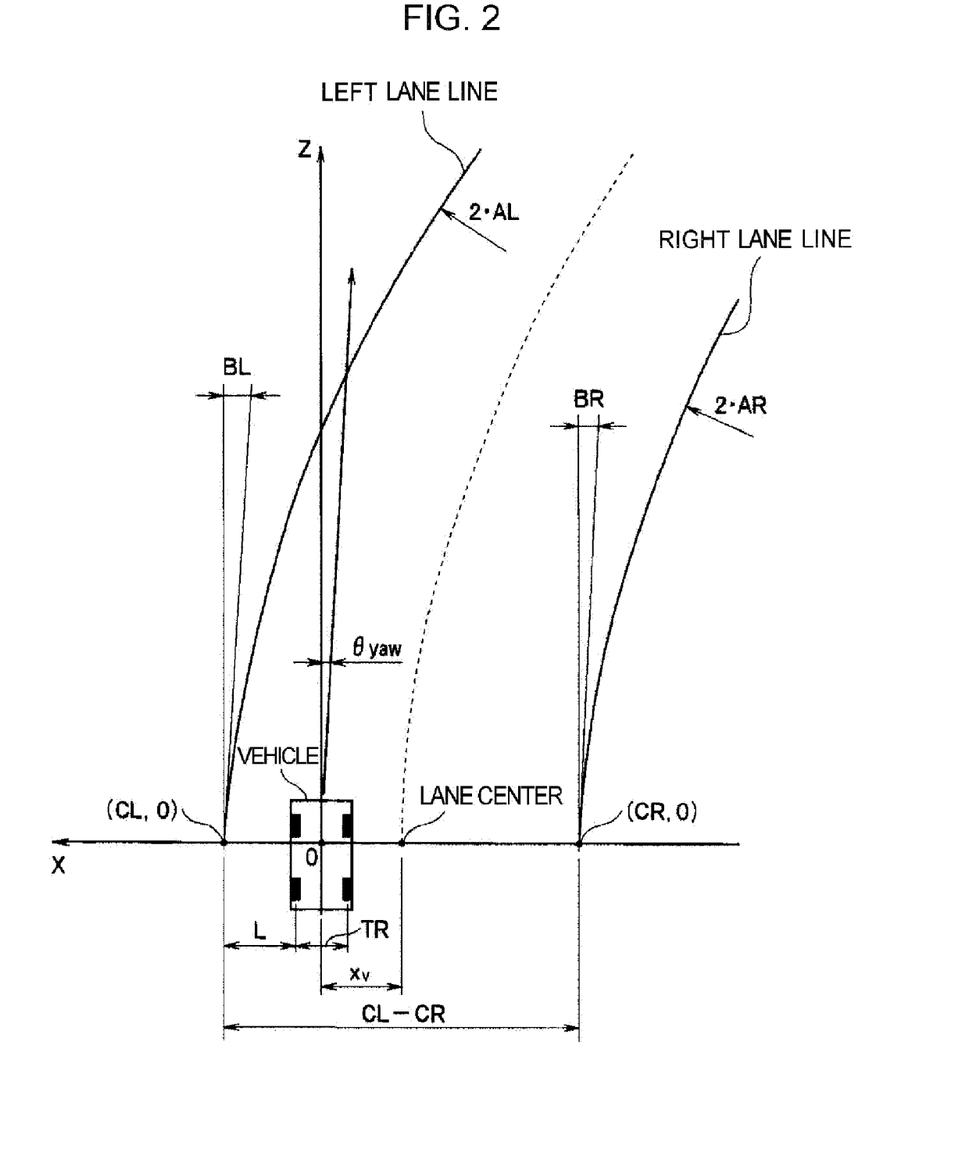
FIG. 2 is an explanatory diagram of a vehicle and a lane on an X-Z coordinate and parameters.

In a coordinate system of the actual space set with reference to the position of the vehicle, in this example, for instance, as illustrated in FIG. 2, a road surface right below the center of a stereo camera is set as the origin, the vehicle width direction is set as the X axis (positive in the left direction), the vehicle height direction is set as the Y axis (positive in the up direction), and the vehicle length direction (the distance direction) is set as the Z axis (positive in the front direction). In this case, when the road is flat, an X-Z plane (Y=0) coincides with the road surface. A road model is represented by dividing a lane of the vehicle on the road into a plurality of sections in the distance direction and approximating as predetermined and connecting left and right lane lines in the sections. Note that, in this example, the shape of the lane is recognized on the basis of images from the pair of CCD cameras. Alternatively, besides, the shape of the lane may be calculated on the basis of image information from a monocular eye camera or a color camera.

The cant angle detection sensor 35 calculates the cant angle θca according to, for instance, the following Expression (1):

$$\theta ca = \sin^{-1}((G'-G)/g) \quad (1),$$

where, g represents gravitational acceleration, G represents a lateral acceleration value detected by a lateral acceleration sensor (not illustrated in the figure), and G' represents a calculated lateral acceleration value calculated by, for instance, the following Expression (2). As in Expression (2) represents a stability factor peculiar to the vehicle and Lw represents a wheelbase.

$$G' = (1/(1+As \cdot V^2)) \cdot (V^2/Lw) \cdot \theta p \quad (2)$$

Note that the cant angle θca may be obtained from, for instance, map information of a not-illustrated navigation system.

Further, a warning control device 40 that controls a warning output to the driver is connected to the steering controller 20 to form a support controller that executes support control for preventing lane deviation. As the support control for the lane deviation prevention, it is assumed that control intervention to control including at least warning control for emitting a warning to the driver, that is, only the warning control for the driver or correction steering and brake control for lane deviation prevention in addition to the warning control for the driver is carried out.

As described below, a function of a support controller in the steering controller 20 includes two functional units, i.e., a first support controller 20a and a second support controller 20b that have different determination conditions for lane deviation. The steering controller 20 calculates a vehicle lateral position xv in the width direction of the lane on the basis of the lane position information and sensor signals. The steering controller 20 selectively executes first support control by the first support controller 20a and second support control by the second support controller 20b.

The support controller calculates the vehicle lateral position xv on the basis of the left and right lane lines acquired by the forward recognition device 31. A lane line (a lane line model) xL on the left side of the vehicle and a lane line (a lane line model) xR on the right side are approximated by the following Expressions (3) and (4) according to a method of least squares:

$$xL = AL \cdot z^2 + BL \cdot z + CL \quad (3)$$

$$xR = AR \cdot z^2 + BR \cdot z + CR \quad (4)$$

"AL" and "AR" in Expression (3) and Expression (4) respectively indicate curvatures in curves of the lane lines. A curvature κ of the lane line on the left side is 2·AL. The curvature κ of the lane line on the right side is 2·AR. "BL" and "BR" in Expression (3) and Expression (4) respectively indicate tilts of the curves in the width direction of the vehicle. "CL" and "CR" respectively indicate positions of the curves in the width direction of the vehicle (see FIG. 2).

Therefore, a yaw angle (a yaw angle to lane) θyaw of the vehicle with respect to the lane can be calculated by the following Expression (5). A vehicle lateral position xv, which is a vehicle position in the width direction from the lane center, can be calculated by the following Expression (6):

$$\theta yaw = (BL+BR)/2 \quad (5)$$

$$xv = (CL+CR)/2 \quad (6)$$

Figure 3:
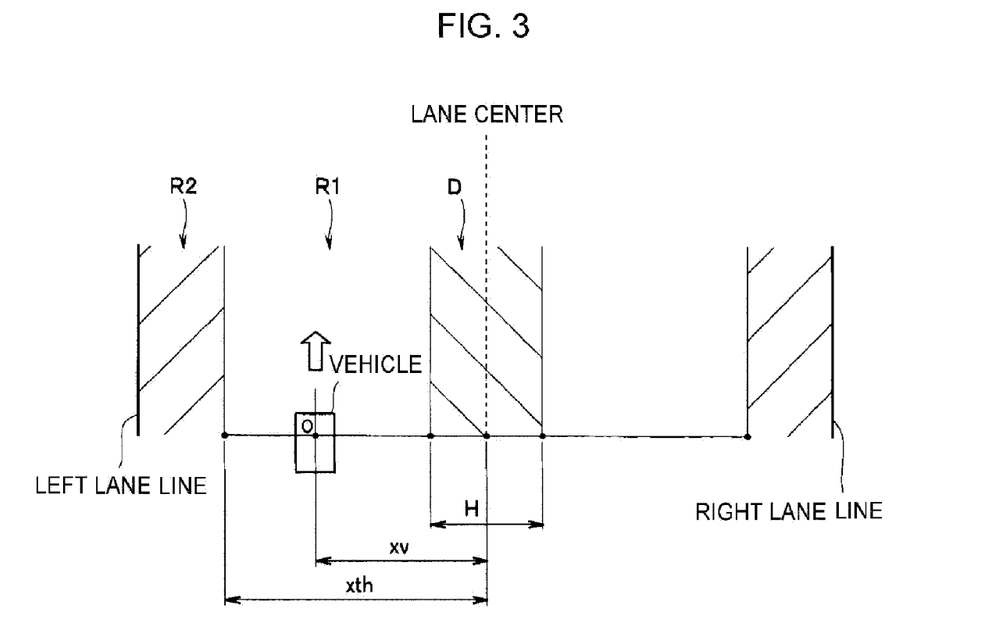
FIG. 3 is an explanatory diagram illustrating a relation between a vehicle lateral position and first and second support controls.

In support control for lane deviation prevention performed using the vehicle lateral position xv by the above Expression (6), as illustrated in FIG. 3, a dead zone D having width H in which the lane deviation prevention control is not carried out is provided in the lane center. When the vehicle is located on the outer side of the dead zone D, the support controller selectively executes the first support control and the second support control according to the vehicle lateral position xv. Note that, in FIG. 3, the vehicle is traveling on the road between the lane center and the left lane line. Alternatively, the same applies when the vehicle is traveling on the right lane line side.

Specifically, the first support control is executed when the vehicle lateral position xv is within a region R1 on the outer side of the dead zone D and on the lane center side further inward than a predetermined position xth, which is a lateral position set in the lane width direction. The second support control is executed when the vehicle lateral position xv is within a region R2 on the lane end side on the outer side of the predetermined position xth.

The first support control is control carried out by determining on the basis of a vehicle lateral position after a predetermined time whether the vehicle deviates from the lane. Specifically, the support controller calculates, on the basis of the vehicle lateral position xv, the yaw angle θyaw of the vehicle, and the vehicle speed V, time until the vehicle reaches a point of intersection Pcp of an estimated traveling path of the vehicle and a lane side edge (a predicted lane deviation time until the vehicle deviates from the lane) Tttlc according to, for instance, the following Expression (7). The support controller compares the predicted lane deviation time Tttlc and a support start time Tst set in advance to thereby determine whether the first support control is started.

$$Tttlc = L/(V \cdot \sin(\theta yaw)) \quad (7)$$

Note that L in Expression (7) represents a lane-to-vehicle distance (see FIG. 2). The lane-to-vehicle distance L is calculated by the following Expression (7'). In Expression (7'), TR represents a tread of the vehicle. In this example, tire positions are used as a reference for lane deviation determination.

$$L = ((CL - CR) - TR)/2 - xv \quad (7')$$

When the predicted lane deviation time Tttlc is shorter than the support start time Tst, the support controller determines that lane deviation occurs and performs warning control and support control such as correction steering. In the warning control, the support controller outputs an auditory warning such as voice or chime sound or a visual warning such as monitor display and emits a lane deviation warning to the driver. In the assist control of the steering correction, the support controller calculates, on the basis of the yaw angle θyaw and the predicted lane deviation time Tttlc, a target yaw rate γt for preventing deviation from the lane according to the following Expression (8):

$$\gamma t = -\theta yaw / Tttlc \quad (8)$$

Subsequently, the support controller calculates, on the basis of the target yaw rate γt and an actual yaw rate γ, a yaw angle of the vehicle for preventing deviation from the lane as a target yaw angle θyawt, according to the following Expression (9), for instance. In Expression (9), θyaw0 represents a yaw angle reference value set in advance by an experiment, calculation, or the like. The yaw angle reference value θyaw0 is set to a small value in a direction opposite to a deviation direction. Gn represents a sensitive gain set on the basis of vehicle speed, a curvature, a cant, a vehicle width, and the like.

$$\theta yawt = Gn \cdot \theta yaw0 \quad (9)$$

After setting the target yaw rate γt, the support controller calculates target torque Tp according to, for instance, the following Expression (10). The support controller outputs the target torque Tp to the motor driver 21 to drive the electric motor 12 to carry out control intervention to the steering correction for avoiding lane deviation. In Expression (10), Kp represents a proportional gain, Ki represents an integral gain, and Kd represents a differential gain.

$$Tp = Kp \cdot (\gamma t - \gamma) + Ki \cdot \int (\gamma t - \gamma) dt + Kd \cdot d(\gamma t - \gamma)/dt \quad (10)$$

On the other hand, the second support control is control carried out by determining on the basis of the present vehicle lateral position xv and the yaw angle θyaw with respect to the lane whether the vehicle deviates from the lane and is control for causing the lane deviation prevention control to properly function even when a yaw angle of the vehicle with respect to the lane is small near a lane boundary. That is, in the first support control based on the predicted lane deviation time Tttlc, even in a situation in which the vehicle is present near the lane boundary, the predicted lane deviation time Tttlc to be calculated is long when the yaw angle of the vehicle with respect to the lane is small. Therefore, as a result, a divergence from deviation prevention start timing desired by the driver occurs. For instance, the driver feels that a start of the lane deviation prevention control is late. Therefore, the support controller switches the support control from the first support control to the second support control near the lane boundary and adjusts start timing of the lane deviation prevention control not to diverge from the feeling of the driver.

Specifically, in the second support control, when the vehicle lateral position xv is within the region R2 in the vicinity of the left lane line or the right lane line and the yaw angle θyaw with respect to the lane points to a direction deviating from the lane continuously for a predetermined time (e.g., when a state in which the yaw angle θyaw with respect to the lane points to the lane outer side or a state in which the yaw angle θyaw points to the lane inner side but is equal to or smaller than a setting value continues for the predetermined time), the support controller determines that lane deviation occurs and performs the warning control and the support control such as the correction steering. In this example, the second support control is different from the first support control only in start timing of the warning and the correction steering by the lane deviation determination. The second support control is basically the same as the first support control in the warning and the support control such as the correction steering. However, the strength of the warning and gains of the steering control may be changed.

The predetermined position xth, which is a vehicle position for switching the first support control and the second support control, is dynamically changed according to traveling environments such as the vehicle speed V, the curvature κ of the lane, the cant angle θca, and the lane width W. The predetermined position xth is dynamically changed by, for instance, setting a reference position in advance, calculating in advance, with an experiment, a simulation, or the like, coefficients for correcting the reference position to create a map, and correcting the reference position with coefficients obtained with reference to the map.

The map of the coefficients for correcting the predetermined position xth may be individually created for each of parameters such as the vehicle speed V, the curvature κ of the lane, the cant angle θca, and the lane width W or may be created as a multi-dimensional map in which the parameters such as the vehicle speed V, the curvature κ of the lane, the cant angle θca, and the lane width W are used. Here, it is assumed that the coefficient map is created for each of the individual parameters. An instance of characteristics of correction coefficients Kv, Kκ, Kca, and Kw having the vehicle speed V of the vehicle, the curvature κ (of the lane), the cant angle θca of a traveling road, and the lane width W as parameters is described. Note that, as values of the correction coefficients increases from 1 indicating no correction, the predetermined position xth further moves towards the lane center.

Figure 4:
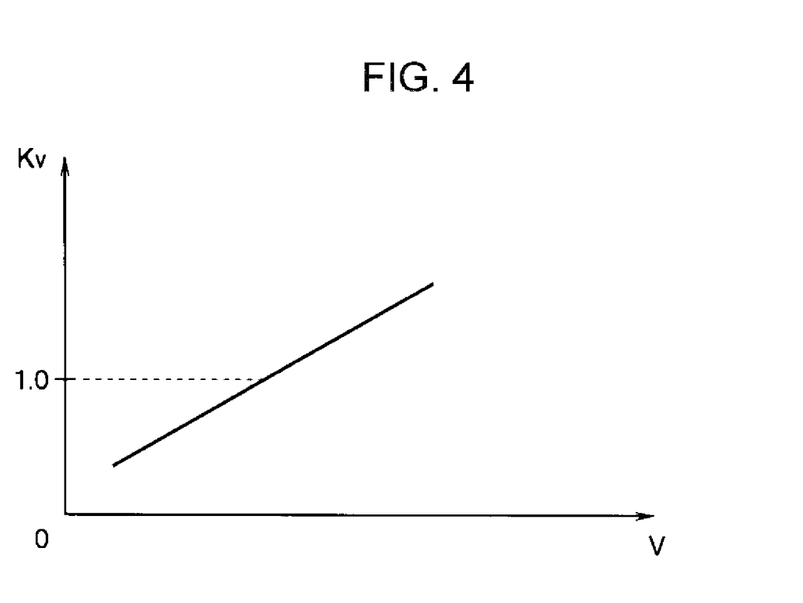
FIG. 4 is an explanatory diagram illustrating a correction characteristic of a predetermined position corresponding to vehicle speed.

For instance, as illustrated in FIG. 4, the correction coefficient Kv of the predetermined position xth corresponding to the vehicle speed V is set such that a coefficient value increases as the vehicle speed V increases. This is for the purpose of, when vehicle speed is high, moving the predetermined position xth towards the lane center, bringing the start timing of the second support control (the support control by the vehicle lateral position) forward, and reliably attaining deviation prevention.

Figure 5:
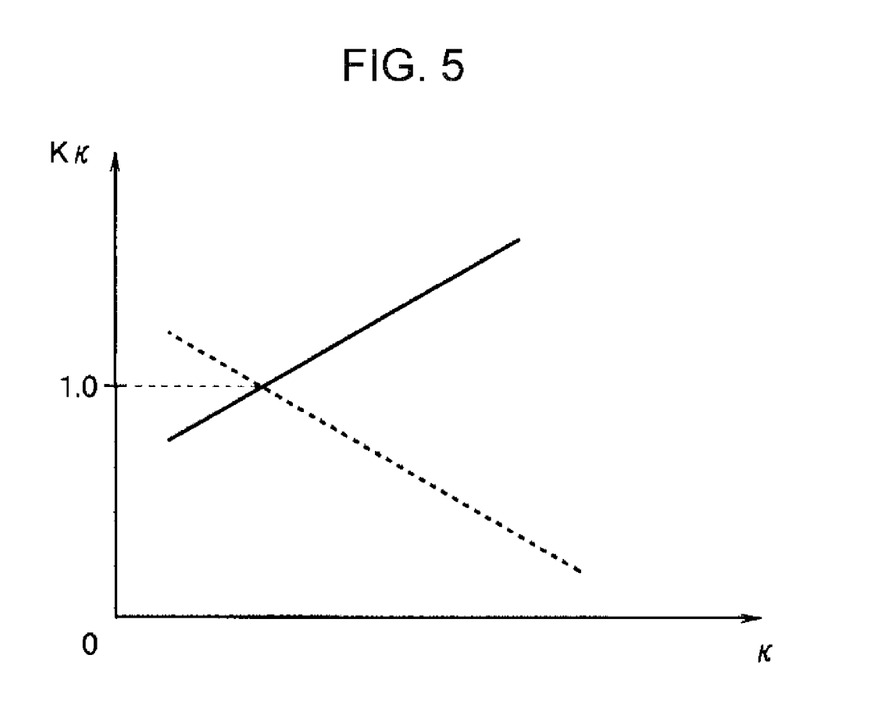
FIG. 5 is an explanatory diagram illustrating a correction characteristic of the predetermined position corresponding to a lane curvature.

For instance, as illustrated in FIG. 5, the correction coefficient Kκ of the predetermined position xth corresponding to the curvature κ is set to different characteristics when the vehicle travels on the outer side of a curve (a characteristic indicated by a solid line in the figure) and when the vehicle travels on the inner side of the curve (a characteristic indicated by a broken line in the figure). When the vehicle travels on the outer side of the curve, the correction coefficient Kκ is set such that a coefficient value increases as the curvature κ increases. When the vehicle travels on the inner side of the curve, the correction coefficient Kκ is set such that the coefficient value decreases as the curvature κ increases.

That is, when the traveling on the outer side of the curve and the traveling on the inner side of the curve are compared, to travel not to deviate from the lane, a relatively larger yaw angle is necessary when the vehicle travels on the inner side of the curve. Therefore, timing for shifting from the first support control to the second support control is adjusted by, as the curvature κ increases, moving the predetermined position xth towards the lane center on the outer side of the curve and moving the predetermined position xth towards the lane end on the inner side of the curve.

Figure 6:
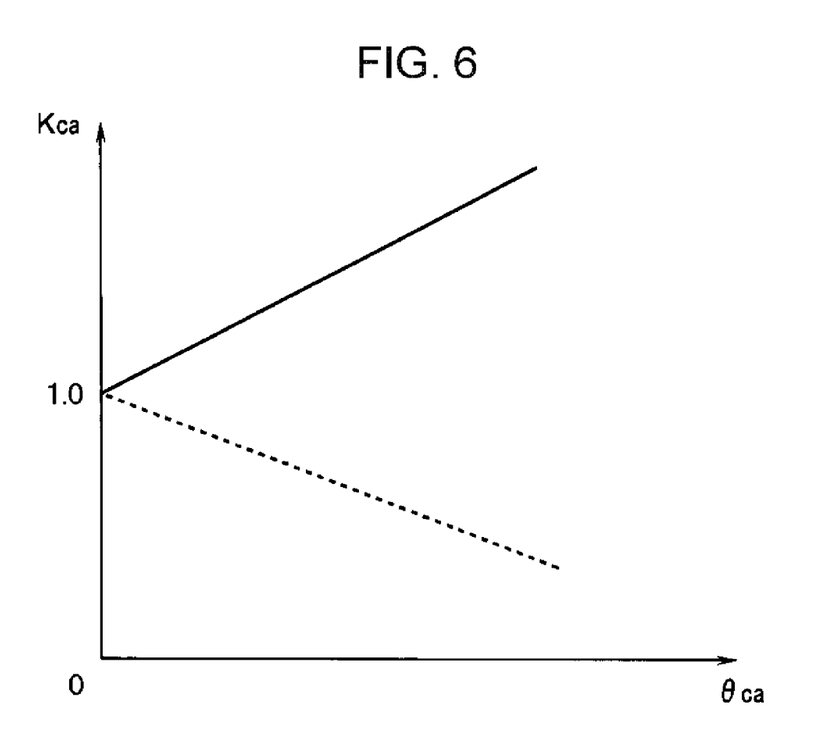
FIG. 6 is an explanatory diagram illustrating a correction characteristic of the predetermined position corresponding to cross slope (hereinafter referred as cant)

Further, for instance, as illustrated in FIG. 6, the correction coefficient Kca of the predetermined position xth corresponding to the cant angle θca is separately set for traveling of the vehicle on the lower side of a cant and traveling of the vehicle on the upper side of the cant. When the vehicle travels on the lower side of the cant, as indicated by a solid line in FIG. 6, the correction coefficient Kca is set to increase as the cant angle θca increases. When the vehicle travels on the upper side of the cant, as indicated by a broken line in FIG. 6, the correction coefficient Kca is set to decrease as the cant angle θca increases.

That is, when the vehicle travels on the lower side of the cant, lateral acceleration due to the gravity descends on the cant and acts in a direction for causing the vehicle to deviate from the lane on the lower side of the cant. Therefore, the predetermined position xth is moved towards the lane center to start the lane deviation prevention control (the second support control) by the vehicle lateral position early. Conversely, when the vehicle travels on the upper side of the cant, the lateral acceleration due to the gravity descends on the cant and acts in a direction in which the lateral acceleration moves away from the lane on the upper side of the cant (a direction for hardly causing the vehicle to deviate from the lane). Therefore, the predetermined position xth is moved towards the end of the lane to make the shift to the second support control gentle. Timing of the warning and the control intervention is adjusted to prevent a divergence from a feeling of the driver.

Figure 7:
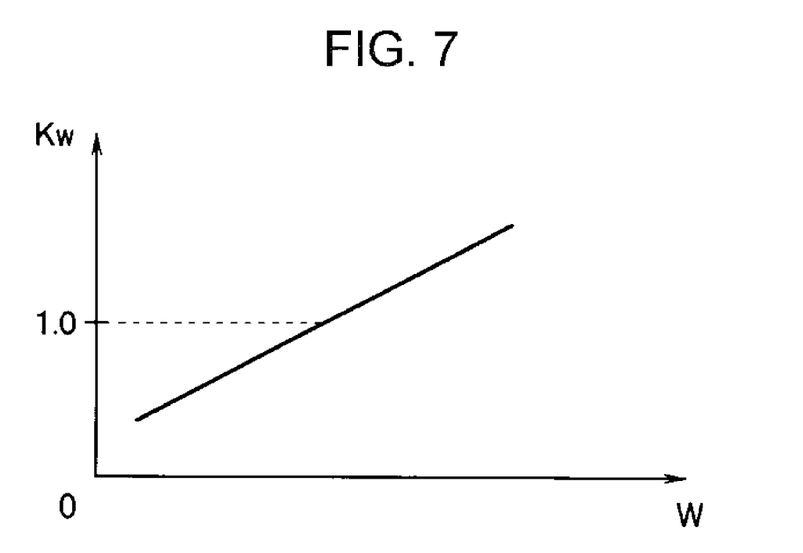
FIG. 7 is an explanatory diagram illustrating a correction characteristic of the predetermined position corresponding to a lane width.

The correction coefficient Kw of the predetermined position xth corresponding to the lane width W is set, as illustrated in FIG. 7 for instance, to a larger value as the lane width W is larger such that the predetermined position xth moves towards the lane center. The predetermined position xth moves towards the lane end as the lane width W is smaller. That is, as the lane width W is larger, in the lane deviation prevention control by the first support control, time until the warning and the steering control of the deviation determination are started is long. Therefore, the predetermined position xth is moved towards the lane center to start the lane deviation prevention control (the second support control) by the vehicle lateral position early. Conversely, when the lane width W is small, the support control is prevented from carelessly shifting from the first support control to the second support control. Switching timing of the first support control and the second support control is adjusted to prevent a sense of discomfort from being given to the driver.

The width H of the dead zone D is set to a fixed width set in advance. However, like the predetermined position xth, the width H may be dynamically changed according to a traveling environment.

Figure 8:
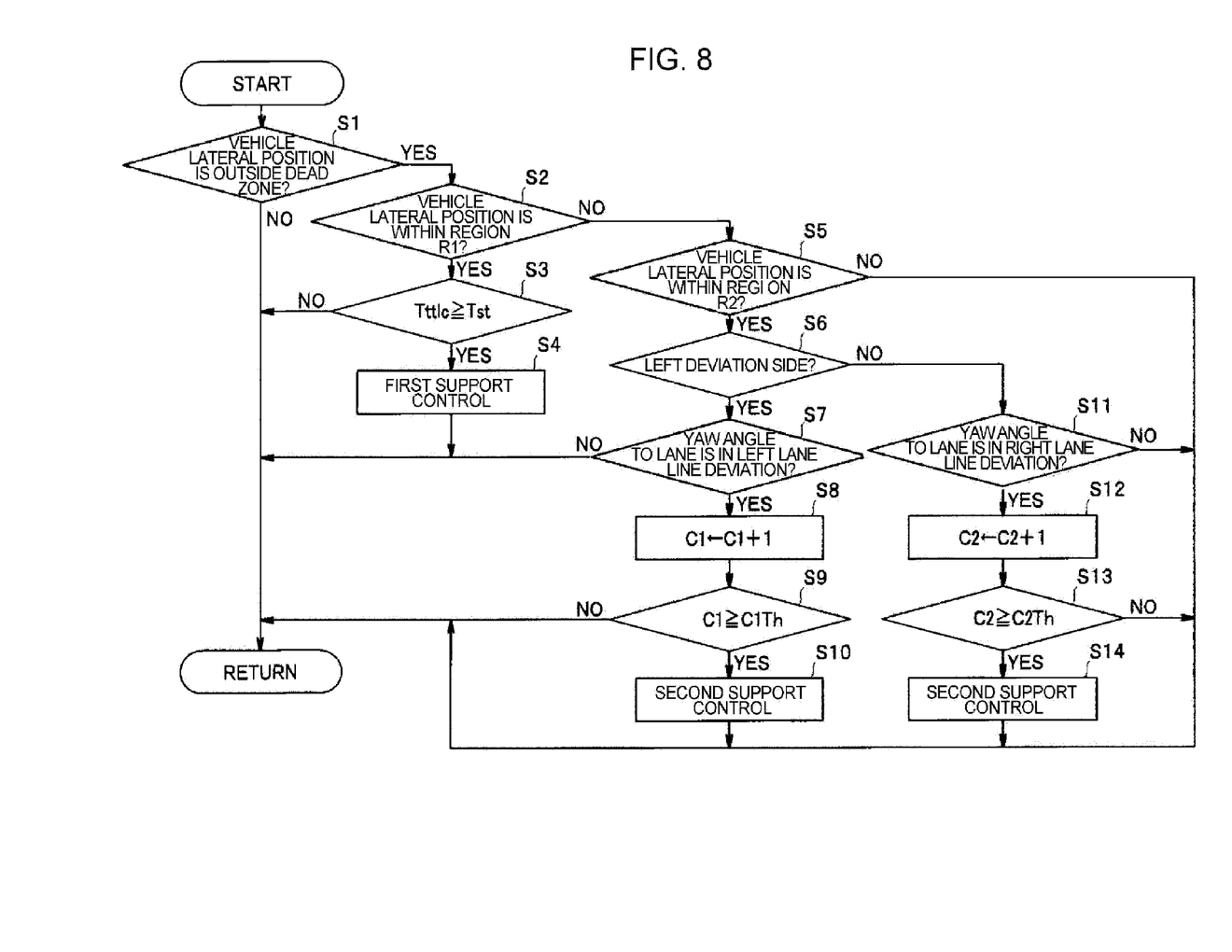
FIG. 8 is a flowchart of lane deviation prevention control.

Program processing of the lane deviation prevention control executed by the steering controller 20 is described with reference to a flowchart of FIG. 8.

In the lane deviation prevention control, first, in first step S1, the steering controller 20 checks whether the present vehicle lateral position xv is on the outer side of the dead zone D. When the vehicle lateral position xv is on the inner side of the dead zone D, the steering controller 20 leaves the processing without executing the control for the lane deviation prevention. When the vehicle lateral position xv is on the outer side of the dead zone D, the steering controller 20 proceeds from step S1 to step S2 and checks whether the vehicle lateral position xv is within the region R1 on the lane center side further inward than the predetermined position xth.

When the vehicle lateral position xv is in the region R1 in step S2, the steering controller 20 proceeds from step S2 to step S3, calculates the predicted lane deviation time Tttlc (see Expression (7)), and checks whether the predicted lane deviation time Tttlc is equal to or longer than the support start time Tst set in advance. When Tttlc<Tst, the steering controller 20 leaves the processing. When Tttlc≥Tst, the steering controller 20 proceeds from step S3 to step S4 and starts the first support control based on the predicted lane deviation time Tttlc.

On the other hand, when the vehicle lateral position xv is not within the region R1 in step S2, the steering controller 20 proceeds from step S2 to step S5, checks a relation between a vehicle lateral position and left and right lane line positions, and determines whether the vehicle is in a lane deviation state. As a result, when the vehicle does not deviate from the lane, the steering controller 20 proceeds from step S5 to step S6 and subsequent steps and performs processing related to the second support control. When the vehicle already deviates from the lane, the steering controller 20 leaves the processing and shifts to lane return processing. Although details are not described, the lane return processing is processing for outputting a warning to the driver, performing steering control towards the lane center, and forcibly actuating a brake according to a situation.

In processing in step S6 and subsequent steps, in step S6, the steering controller 20 checks whether the vehicle is on a left deviation side or a right deviation side, that is, whether the vehicle lateral position is in the vicinity of the left lane line inner side or in the vicinity of the right lane line inner side. When the vehicle lateral position is on the left deviation side, the steering controller 20 proceeds to step S7. When the vehicle lateral position is on the right deviation side, the steering controller 20 proceeds to step S11. First, processing on the left deviation side is described and, then, processing on the right deviation side is described.

In the processing on the left deviation side, in step S7, the steering controller 20 checks whether the yaw angle (the yaw angel to lane) θyaw with respect to the lane is an angle in a direction in which the vehicle deviates from the left while line. As a result, when, for instance, the yaw angle to lane θyaw points towards the lane center with respect to the left lane line and is not in the direction in which the vehicle deviates from the left lane line, the steering controller 20 leaves the processing in step S7. When the yaw angle to lane θyaw is in the direction in which the vehicle deviates from the left lane angle, the steering controller 20 proceeds from step S7 to step S8.

In step S8, the steering controller 20 counts up (C1←C1+1) a counter C1 for counting time of continuation of a state of the direction in which the vehicle deviates from the left lane line. In step S9, the steering controller 20 checks whether the counter C1 is equal to or larger than a predetermined value C1Th equivalent to a support start time set in advance. When C1<C1Th, the steering controller 20 leaves the processing. When C1≥C1Th, in step S10, the steering controller 20 starts the second support control based on the vehicle lateral position.

On the other hand, in processing in step S11 and subsequent steps on the right deviation side, in step S11, the steering controller 20 checks whether the yaw angle to lane θyaw points towards the lane center with respect to the right lane line and is not in a direction in which the vehicle deviates from the right lane line, the steering controller 20 leaves the processing in step S11. When the yaw angle to lane θyaw is in the direction in which the vehicle deviates from the right lane line, the steering controller 20 proceeds from step S11 to step S12.

In step S12, the steering controller 20 counts up (C2←C2+1) a counter C2 for counting time of continuation of a state of the direction in which the vehicle deviates from the right lane line. In step S13, the steering controller 20 checks whether the counter C2 is equal to or larger than a predetermined value C2Th equivalent to a support start time set in advance. When C2<C2Th, the steering controller 20 leaves the processing. When C2≥C2Th, in step S14, the steering controller 20 starts the second support control.

The control processing in steps S7 to S10 on the left deviation side and the control processing in steps S11 to S14 on the right deviation side are different only in a determination standard for the yaw angle to lane θyaw in steps S7 and S11. The predetermined values C1Th and C2Th of the counters and the contents of the second support control are basically the same. Alternatively, control contents for the left and the right may be adjusted according to the number of lanes of a road, the position of a lane in which the vehicle is currently traveling, and the like.

As described above, in this example, when the vehicle lateral position xv is within the region R1 on the outer side of the dead zone D and on the lane center side further inward than the predetermined position xth, which is the lateral position set in the lane width direction, the first support control for determining lane deviation on the basis of the predicted lane deviation time Tttlc is selected. When the vehicle lateral position xv is within the region R2 on the lane end side on the outer side of the predetermined position xth, the second support control for determining lane deviation on the basis of the vehicle lateral position xv and the yaw angle to lane θyaw is selected. Consequently, it is possible to start, without diverging from a sense of the driver, the lane deviation prevention control early in a situation in which the vehicle is traveling near the lane boundary. Therefore, a sense of discomfort is not given to the driver.

The invention claimed is:

1. A lane deviation prevention control apparatus of a vehicle comprising:
   a support controller that determines whether or not the vehicle deviates from a lane in which the vehicle is traveling and, when determining that the vehicle deviates from the lane, executes support control including at least a warning for preventing the lane deviation,
   wherein the support controller includes:
      a first support controller that calculates a predicted lane deviation time until the vehicle deviates from the lane in future, on the basis of a vehicle lateral position in a width direction of the lane in which the vehicle is traveling, a yaw angle of the vehicle with respect to the lane, and vehicle speed, and determines the lane deviation from the predicted lane deviation time; and
      a second support controller that determines whether the vehicle deviates from the lane, when the yaw angle of the vehicle with respect to the lane points to a direction deviating from the lane, and
   wherein the support controller selects the first support controller when the vehicle lateral position is closer to a lane center than to a predetermined position that is set according to a traveling environment, and selects the second support controller when the vehicle lateral position is closer to a lane end than to the predetermined position.

2. The lane deviation prevention control apparatus of a vehicle according to claim 1, wherein a dead zone where the support control is not executed is set at a predetermined region along the lane center.

3. The lane deviation prevention control apparatus of a vehicle according to claim 1, wherein the predetermined position is set variably according to vehicle speed and is set closer to the lane center as the vehicle speed increases.

4. The lane deviation prevention control apparatus of a vehicle according to claim 2, wherein the predetermined position is set variably according to vehicle speed and is set closer to the lane center as the vehicle speed increases.

5. The lane deviation prevention control apparatus of a vehicle according to claim 1, wherein the predetermined position is set variably according to a curvature of the lane and, as the curvature of the lane increases, the predetermined position on an outer side of a curve is set closer to the lane center and the predetermined position inside the curve is set closer to the lane end.

6. The lane deviation prevention control apparatus of a vehicle according to claim 2, wherein the predetermined position is set variably according to a curvature of the lane and, as the curvature of the lane increases, the predetermined position on an outer side of a curve is set closer to the lane center and the predetermined position inside the curve is set closer to the lane end.

7. The lane deviation prevention control apparatus of a vehicle according to claim 3, wherein the predetermined position is set variably according to a curvature of the lane and, as the curvature of the lane increases, the predetermined position on an outer side of a curve is set closer to the lane center and the predetermined position inside the curve is set closer to the lane end.

8. The lane deviation prevention control apparatus of a vehicle according to claim 4, wherein the predetermined position is set variably according to a curvature of the lane and, as the curvature of the lane increases, the predetermined position on an outer side of a curve is set closer to the lane center and the predetermined position inside the curve is set closer to the lane end.

9. The lane deviation prevention control apparatus of a vehicle according to claim 1, wherein the predetermined position is set variably according to a width of the lane and is set closer to the lane center as the width of the lane increases.

10. The lane deviation prevention control apparatus of a vehicle according to claim 2, wherein the predetermined position is set variably according to a width of the lane and is set closer to the lane center as the width of the lane increases.

11. The lane deviation prevention control apparatus of a vehicle according to claim 3, wherein the predetermined position is set variably according to a width of the lane and is set closer to the lane center as the width of the lane increases.

12. The lane deviation prevention control apparatus of a vehicle according to claim 4, wherein the predetermined position is set variably according to a width of the lane and is set closer to the lane center as the width of the lane increases.

13. The lane deviation prevention control apparatus of a vehicle according to claim 1, wherein the predetermined position is set variably according to a cant of a traveling road and, as the cant increases, the predetermined position is set closer to the lane end on an upper side of the cant and the predetermined position is set closer to the lane center on a lower side of the cant.

14. The lane deviation prevention control apparatus of a vehicle according to claim 2, wherein the predetermined position is set variably according to a cant of a traveling road and, as the cant increases, the predetermined position is set closer to the lane end on an upper side of the cant and the predetermined position is set closer to the lane center on a lower side of the cant.

15. The lane deviation prevention control apparatus of a vehicle according to claim 3, wherein the predetermined position is set variably according to a cant of a traveling road and, as the cant increases, the predetermined position is set closer to the lane end on an upper side of the cant and the predetermined position is set closer to the lane center on a lower side of the cant.

16. The lane deviation prevention control apparatus of a vehicle according to claim 4, wherein the predetermined position is set variably according to a cant of a traveling road and, as the cant increases, the predetermined position is set closer to the lane end on an upper side of the cant and the predetermined position is set closer to the lane center on a lower side of the cant.

* * * * *